United States Patent
Arakawa et al.

(10) Patent No.: US 11,067,041 B2
(45) Date of Patent: Jul. 20, 2021

(54) CONTROL DEVICE FOR INTERNAL COMBUSTION ENGINE

(71) Applicant: HITACHI AUTOMOTIVE SYSTEMS, LTD., Ibaraki (JP)

(72) Inventors: Takafumi Arakawa, Tokyo (JP); Yoichi Iihoshi, Tokyo (JP); Kunihiko Suzuki, Tokyo (JP); Toshio Hori, Ibaraki (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 55 days.

(21) Appl. No.: 16/478,077

(22) PCT Filed: Dec. 27, 2017

(86) PCT No.: PCT/JP2017/046876
§ 371 (c)(1),
(2) Date: Jul. 15, 2019

(87) PCT Pub. No.: WO2018/135265
PCT Pub. Date: Jul. 26, 2018

(65) Prior Publication Data
US 2019/0368448 A1    Dec. 5, 2019

(30) Foreign Application Priority Data

Jan. 23, 2017   (JP) .............................. JP2017-009144

(51) Int. Cl.
*F02M 26/47*   (2016.01)
*F02M 26/48*   (2016.01)
(Continued)

(52) U.S. Cl.
CPC ......... *F02M 26/47* (2016.02); *F02D 41/0052* (2013.01); *F02D 41/0072* (2013.01);
(Continued)

(58) Field of Classification Search
CPC ........ F02M 26/47; F02M 26/48; F02M 26/06; F02D 41/0052; F02D 41/0072;
(Continued)

(56) References Cited

U.S. PATENT DOCUMENTS 2,456,562 A  * 12/1948  Lindsay .................... C02F 1/18
                                                          202/205
4,823,760 A  *  4/1989  Nishida ............... F02D 41/0072
                                                         123/406.48
(Continued)

FOREIGN PATENT DOCUMENTS

JP     2001-280202 A    10/2001
JP     2004-360535 A    12/2004
(Continued)

OTHER PUBLICATIONS

International Search Report for PCT/JP2017/046876 A1, dated Apr. 24, 2018.

*Primary Examiner* — Sizo B Vilakazi
*Assistant Examiner* — Brian R Kirby
(74) *Attorney, Agent, or Firm* — Volpe Koenig

(57) ABSTRACT

A novel control device for an internal combustion engine capable of highly accurately estimating an EGR amount (rate) during the transient state is provided. A first EGR rate is determined using, as an input, a detection signal of an EGR sensor provided on the downstream side of a throttle valve which adjusts the flow rate of a mixed gas of air and EGR gas flowing through an intake pipe, a second EGR rate is estimated by calculating a predetermined equation using, as an input, at least a detection signal of an air flow sensor and an EGR valve opening degree sensor, a third EGR rate is determined by carrying out delay processing on the second EGR rate corresponding to a response delay of the EGR sensor, and the second EGR rate is subjected to (Continued)

learning correction by reflecting a difference between the third EGR rate and the first EGR rate.

10 Claims, 10 Drawing Sheets

(51) Int. Cl.
    *F02D 41/00*     (2006.01)
    *F02D 41/18*     (2006.01)
    *F02D 41/24*     (2006.01)
    *F02P 5/04*     (2006.01)
    *F02P 5/15*     (2006.01)

(52) U.S. Cl.
    CPC ......... *F02D 41/18* (2013.01); *F02D 41/2451* (2013.01); *F02M 26/48* (2016.02); *F02P 5/045* (2013.01); *F02P 5/1516* (2013.01); *F02D 2041/0075* (2013.01); *F02D 2200/0404* (2013.01); *F02D 2200/0418* (2013.01)

(58) Field of Classification Search
    CPC .......... F02D 41/18; F02D 41/2451; F02D 2041/0075; F02D 2200/0404; F02D 2200/0418; F02D 41/107; F02D 41/2438; F02D 41/0007; F02P 5/045; F02P 5/1516; F02P 5/1528
    USPC ........................................ 123/568.11, 568.22
    See application file for complete search history.

(56) References Cited

U.S. PATENT DOCUMENTS

| | | | | |
|---|---|---|---|---|
| 4,942,860 | A * | 7/1990 | Chujo | F02D 41/0007 123/406.44 |
| 5,505,174 | A * | 4/1996 | Komoriya | F02M 26/57 123/406.48 |
| 5,727,528 | A * | 3/1998 | Hori | F02D 41/0072 123/486 |
| 5,845,627 | A * | 12/1998 | Olin | F02D 41/1401 123/676 |
| 6,000,385 | A * | 12/1999 | Fukuma | F02M 26/46 123/704 |
| 6,029,451 | A * | 2/2000 | Gartner | F02D 41/1441 60/605.2 |
| 6,062,204 | A * | 5/2000 | Cullen | F02M 26/47 123/568.22 |
| 6,247,462 | B1 * | 6/2001 | Wild | F02D 41/0072 123/568.21 |
| 6,871,134 | B2 * | 3/2005 | Lange | F02D 41/0072 701/108 |
| 7,155,332 | B2 * | 12/2006 | Yamada | G01F 1/86 701/108 |
| 7,493,896 | B2 * | 2/2009 | El Tahry | F02D 41/0072 123/568.12 |
| 7,715,976 | B1 * | 5/2010 | Xiao | F02M 26/46 701/108 |
| 9,157,390 | B2 * | 10/2015 | Song | F02D 41/0072 |
| 9,506,420 | B2 * | 11/2016 | Ramappan | F02D 43/04 |
| 2002/0066442 | A1 * | 6/2002 | Muller | G01N 33/0018 123/568.11 |
| 2003/0041845 | A1 * | 3/2003 | Akao | F02D 41/0072 123/568.16 |
| 2004/0217180 | A1 * | 11/2004 | Lu | F04C 29/0007 236/44 C |
| 2005/0021218 | A1 * | 1/2005 | Bhargava | F02D 41/0007 701/108 |
| 2007/0204840 | A1 * | 9/2007 | Abe | F02D 41/1494 123/697 |
| 2008/0275627 | A1 * | 11/2008 | Matsunaga | F02D 41/144 701/108 |
| 2009/0143959 | A1 * | 6/2009 | Yamaoka | F02M 26/05 701/108 |
| 2010/0236532 | A1 * | 9/2010 | Xiao | F02D 41/146 123/677 |
| 2010/0332075 | A1 * | 12/2010 | Clarke | F02M 26/42 701/33.4 |
| 2011/0017179 | A1 * | 1/2011 | Ichihara | F02M 26/47 123/568.21 |
| 2013/0024088 | A1 * | 1/2013 | Suzuki | F02D 41/1494 701/102 |
| 2014/0251287 | A1 * | 9/2014 | Takezoe | F02D 41/0052 123/568.11 |
| 2014/0298880 | A1 * | 10/2014 | Pursifull | F02D 41/222 73/1.06 |
| 2015/0057910 | A1 * | 2/2015 | Surnilla | F02D 41/1494 701/108 |
| 2015/0101328 | A1 * | 4/2015 | Surnilla | F02M 25/089 60/599 |
| 2015/0292429 | A1 * | 10/2015 | Surnilla | F01M 13/00 701/108 |
| 2016/0131017 | A1 * | 5/2016 | Uto | F02B 29/0443 123/41.02 |
| 2016/0177847 | A1 * | 6/2016 | Surnilla | F02M 35/10373 701/108 |
| 2016/0230684 | A1 * | 8/2016 | Surnilla | F02D 41/0065 |
| 2017/0082047 | A1 * | 3/2017 | Yokono | F02D 41/0002 |
| 2017/0145903 | A1 * | 5/2017 | Sadakane | F02M 26/33 |
| 2018/0149064 | A1 * | 5/2018 | Pachner | F02D 41/1458 |

FOREIGN PATENT DOCUMENTS

| | | |
|---|---|---|
| JP | 2013-108464 A | 6/2013 |
| JP | 2014-169684 A | 9/2014 |
| JP | 2016-113906 A | 6/2016 |
| WO | 2006/095908 A1 | 9/2006 |

* cited by examiner

FIG. 7A  (COMPOSITION OF AIR)
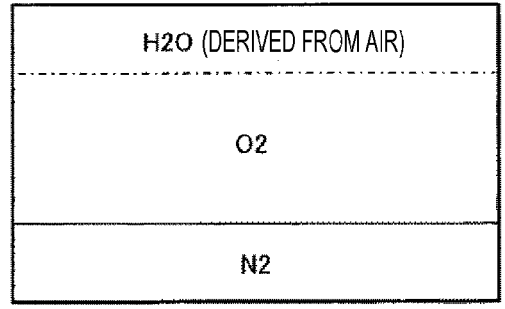
FIG. 7B  (COMPOSITION OF AIR+EGR)
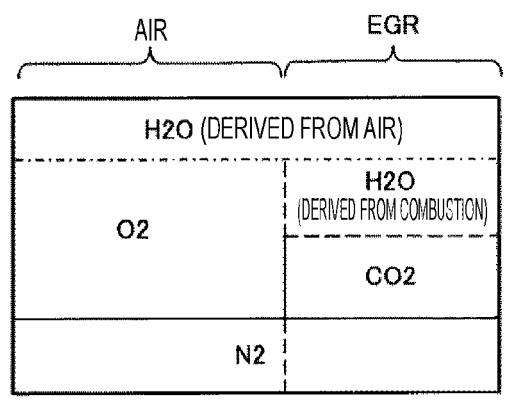
FIG. 7C  (COMPOSITION OF AIR+EGR (IN DEW CONDENSATION))
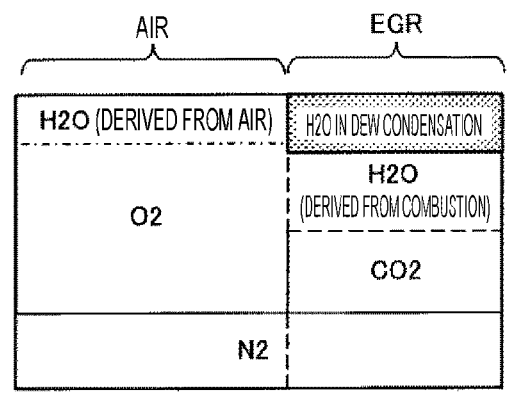

CONTROL DEVICE FOR INTERNAL COMBUSTION ENGINE

TECHNICAL FIELD

The present invention relates to a control device for an internal combustion engine, and more particularly to a control device for an internal combustion engine provided with an external EGR device.

BACKGROUND ART

In recent years, regulations concerning fuel consumption of automobiles (hereinafter referred to as fuel consumption) and hazardous exhaust gas have been strengthened and will become severer in the future. Regarding the fuel consumption, in particular, low fuel consumption is strongly required due to the influence of discharged carbon dioxide on global warming. To advance low fuel consumption, it is likely recently to provide a supercharger, such as a turbocharger, to increase the compression ratio. However, in a case where the internal combustion engine provides a relatively high output, a possibility of occurrence of abnormal combustion, such as knocking, increases. To avoid abnormal combustion, ignition timing is retarded.

Retarding ignition timing, however, requires a large amount of fuel to maintain the output, thus deteriorating the fuel consumption. Therefore, the fuel consumption is improved by reintroducing a recirculation exhaust gas (hereinafter referred to as EGR gas) into the combustion chamber by the external EGR device to prevent knocking and set an appropriate value for the ignition timing. For this reason, it is necessary to accurately determine the amount of EGR introduced into the combustion chamber or the EGR rate. Here, the EGR rate refers to a value defined by EGR gas amount/(air flow rate+EGR gas amount).

As a method of estimating the EGR amount (rate), an external EGR device described in, for example, JP 2001-280202 A (PTL 1) or JP 2013-108464 A (PTL 2) has been known. PTL 1 discloses a method of accurately estimating the EGR amount (rate) from the differential pressure across the EGR valve and the EGR valve opening degree. PTL 2 discloses a method of accurately estimating the EGR amount (rate) using an intake air amount sensor and an oxygen concentration sensor provided in the intake system.

CITATION LIST

Patent Literature

PTL 1: JP 2001-280202 A
PTL 2: JP 2013-108464 A

SUMMARY OF INVENTION

Technical Problem

The external EGR device may include a system called a low pressure EGR system in which the exhaust gas is taken out from the downstream side of the turbine of the supercharger provided in the exhaust pipe and the EGR gas is introduced to the upstream of the compressor of the supercharger provided in the intake pipe. In the low pressure EGR system, a relatively long passage distance is provided between the point where the EGR gas is introduced into the intake pipe and the combustion chamber. When the mixed gas of air and EGR gas moves through the long passage distance, the mixed gas passes through a plurality of control valves for controlling the flow rate and pressure of the mixed gas and a cooler for reducing the temperature of the mixed gas.

For this reason, in the case of using only the EGR valve opening degree and the differential pressure as in PTL 1, the estimation accuracy of the EGR amount (rate) may deteriorate during the transient state in which the operation region of the internal combustion engine changes. Further, in the case of providing an EGR sensor such as an oxygen sensor for detecting the EGR amount (rate) in the intake pipe as in PTL 2, the EGR sensor is used to detect the EGR amount (rate) with high accuracy if the internal combustion engine operates in a constant operation region. However, in the transient state in which the operating region of the internal combustion engine varies, the response characteristic of the EGR sensor is often slower than the speed at which the EGR amount (rate) changes, thus making it difficult to appropriately estimate the EGR amount (rate) during the transient state.

Therefore, an appropriate amount of EGR gas may not be introduced into the combustion chamber, causing unstable combustion of the combustible air-fuel mixture in the combustion chamber and deteriorating the fuel consumption.

An object of the present invention is to provide a novel control device for an internal combustion engine capable of highly accurately estimating the EGR amount (rate) in the transient state.

Solution to Problem

In the present invention, a first EGR rate is determined using, as an input, a detection signal of an EGR sensor provided on the downstream side of a throttle valve which adjusts a flow rate of a mixed gas of air and EGR gas flowing through an intake pipe, a second EGR rate is estimated using, as an input, one or more detection signals of at least an air flow sensor, an EGR valve opening degree sensor, and a throttle valve opening degree sensor, a third EGR rate is determined by carrying out delay processing on the second EGR rate corresponding to a response delay of the EGR sensor, and the second EGR rate is subjected to learning correction by reflecting a difference between the third EGR rate and the first EGR rate.

Advantageous Effects of Invention

According to the present invention, the EGR rate can be estimated with high accuracy even in the transient state. As a result, an appropriate amount of EGR gas is introduced into the combustion chamber to avoid abnormal combustion, whereby deterioration of fuel consumption can be prevented.

BRIEF DESCRIPTION OF DRAWINGS

FIG. 7A is an explanatory diagram for explaining a gas composition in an intake pipe when the gas is air.

FIG. 7B is an explanatory diagram for explaining a gas composition in the intake pipe when the gas is a mixed gas of air and exhaust gas.

FIG. 7C is an explanatory diagram for explaining a gas composition in the intake pipe when the gas is a mixed gas of air, exhaust gas, and moisture.

DESCRIPTION OF EMBODIMENTS

Embodiments of the present invention will be described in detail below with reference to the accompanying drawings. The present invention, however, is not limited to the following embodiments, and various modifications and application examples within the technical concept of the present invention also fall within that range.

First Embodiment

Figure 1:
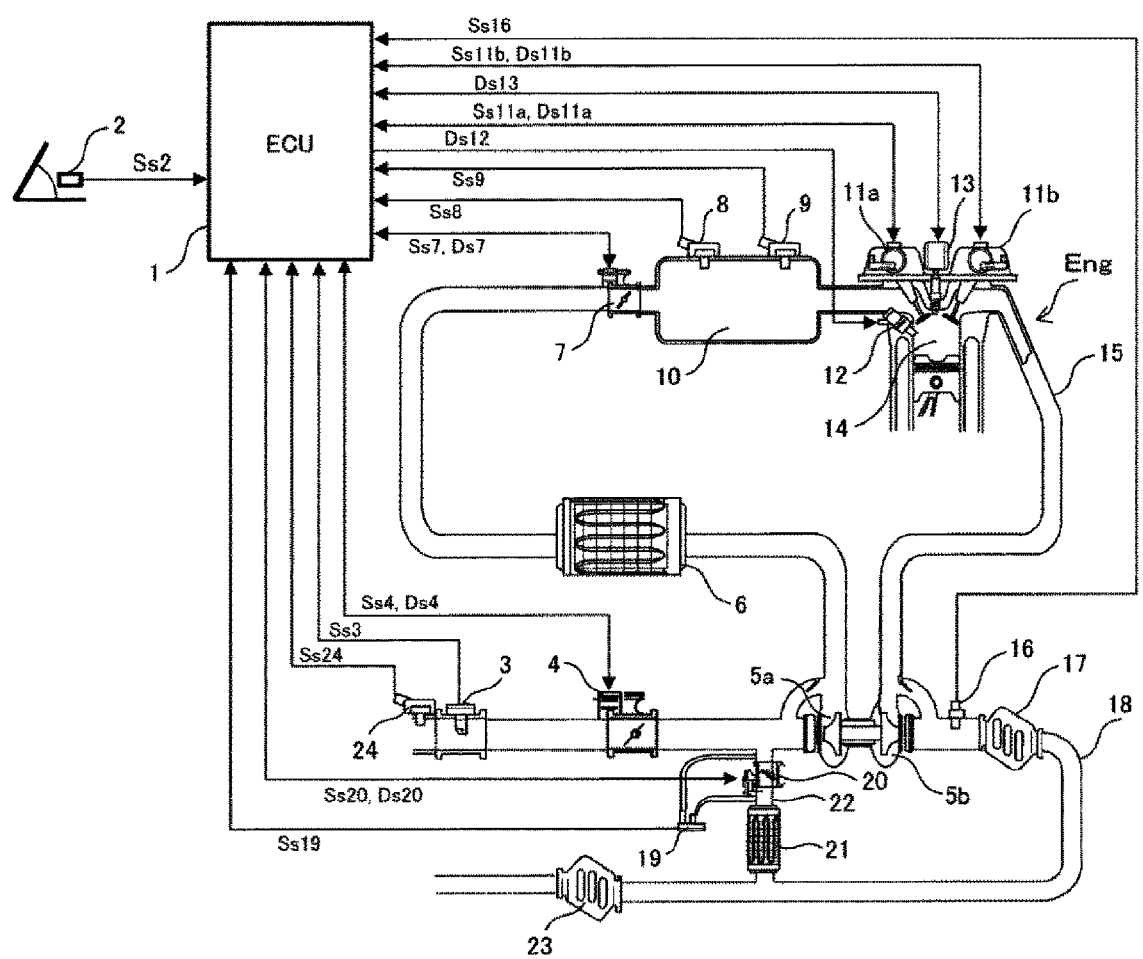
FIG. 1 is a configuration diagram of a system configuration of an internal combustion engine to which the present invention is applied.

FIG. 1 illustrates a system configuration of an internal combustion engine according to a first embodiment of the present invention. An internal combustion engine Eng is a spark ignition-type internal combustion engine.

The internal combustion engine Eng includes the following components that are disposed appropriately about an intake pipe 10: an air flow (or mass flow) sensor 3 that measures an air flow rate at an inlet of an intake pipe serving as an intake system, an atmospheric humidity sensor 24 that measures humidity of the intake air, an intake pipe pressure sensor 8 that measures an intake pipe pressure, a mixed gas humidity sensor 9 that detects a humidity of the mixed gas of air and exhaust gas immediately before the gas enters a combustion chamber 14, a first throttle valve 4 that adjusts the pressure of intake mixed gas, a second throttle valve 7 that adjusts the amount of the intake mixed gas, a compressor 5a of a supercharger that compresses the intake mixed gas, and an intercooler 6 that cools the intake mixed gas to decrease the temperature.

The internal combustion engine Eng also includes a fuel injection valve 12 injecting fuel into a combustion chamber 14 and an ignition plug 13 that supplies ignition energy which are disposed in individual appropriate positions of the internal combustion engine Eng. Also provided are an intake-side movable valve mechanism 11a that controls opening and closing phases of an intake valve and an exhaust-side movable valve mechanism 11b that controls opening and closing phases of an exhaust valve. The movable valve mechanism may also be referred to as a valve timing control system (VTC).

Further, a turbine 5b that drives a compressor 5a using the exhaust gas energy, a three-way catalyst 17 that purifies exhaust gas, and an air-fuel ratio sensor 16 which is one type of an air-fuel ratio detector detecting an air-fuel ratio of the exhaust gas on the upstream side of the three-way catalyst 17 are disposed appropriately about an exhaust pipe 15 serving as an exhaust system. The air-fuel ratio sensor 16 may be an oxygen concentration sensor. An exhaust pipe 18 is connected in the downstream of the three-way catalyst 17, and a three-way catalyst 23 is provided at an appropriate position in the exhaust pipe 18.

An EGR pipe 22 taking out EGR gas branches in the upstream of the three-way catalyst 23 of the exhaust pipe 18. An EGR cooler 21 cooling the EGR gas, an EGR valve 20 adjusting the EGR amount, and a differential pressure sensor 19 measuring the pressure before and after the EGR valve are disposed appropriately about the EGR pipe 22.

Detection signals are sent to a control unit (hereinafter referred to as an ECU) 1 serving as a control unit, the detection signals including a detection signal Ss3 obtained from the air flow sensor 3, detection signals Ss7 and Ss4 obtained respectively from the opening degree sensors of the first and second throttle valves 4 and 7, a detection signal Ss8 obtained from the intake pipe pressure sensor 8, a detection signal Ss9 obtained from the mixed gas humidity sensor 9, detection signals Ss11a and Ss11b obtained respectively from the intake/exhaust movable valve mechanisms 11a and 11b, a detection signal Ss16 obtained from the air-fuel ratio sensor 16, a detection signal Ss19 obtained from the differential pressure sensor 19, a detection signal Ss20 obtained from the EGR valve 20, and the detection signal Ss24 obtained from the atmospheric humidity sensor 24. A signal Ss2 obtained from an accelerator opening degree sensor 2 detecting a depression amount of the accelerator pedal, that is, an accelerator opening degree, is also sent to the ECU 1.

The ECU 1 calculates a required torque on the basis of the output signal Ss2 of the accelerator opening degree sensor 2 and various sensor signals. That is, the accelerator opening degree sensor 2 is used as a required torque detection sensor detecting the required torque to the internal combustion engine Eng. The ECU 1 optimally calculates major operation amounts of the internal combustion engine Eng on the basis of the operation state of the internal combustion engine Eng obtained from each output of the various sensors, the major operation amounts including the opening degree of the first throttle valve 4, the opening degree of the second throttle valve 7, an injection pulse period of the fuel injection valve 12, an ignition timing of the ignition plug 13, opening and closing timings of the intake-side movable valve mechanism 11a and the exhaust-side movable valve mechanism 11b, the opening degree of the EGR valve 20, and the like.

The fuel injection pulse period calculated by the ECU 1 is converted into a fuel-injection-valve open-valve-pulse signal Ds12 and sent to the fuel injection valve 12. The opening degree of the first throttle valve 4 calculated by the ECU 1 is sent to the first throttle valve 4 as a first throttle valve drive signal Ds4. Similarly, the opening degree of the second throttle valve 7 is sent to the second throttle valve 7 as a second throttle valve drive signal Ds7. An ignition plug drive signal Ds13 is sent to the ignition plug 13, and the fuel injection valve drive signal Ds12 is sent to the fuel injection valve 12. An EGR valve drive signal Ds20 is sent to the EGR valve 20.

In the above configuration, a mixed gas flows into the combustion chamber 14 from the intake pipe 10 via the intake valve. To the mixed gas, fuel is injected from a fuel injection valve 12 through a fuel pump from a fuel tank, which is not illustrated, to generate a combustible air-fuel mixture. The combustible air-fuel mixture is ignited and burned by a spark generated from the ignition plug 13 at predetermined ignition timing, and a resulting combustion pressure pushes down the piston to generate a rotational driving force.

After combustion, the exhaust gas passes through the exhaust valve, the exhaust pipe 15, and the turbine 5b to the three-way catalyst 17 where components, such as NOx, CO, and HC, are purified in the three-way catalyst 17, purified again in the three-way catalyst 23, and discharged externally through the exhaust pipe 18. Meanwhile, the exhaust gas is partially reintroduced into the intake pipe as the EGR gas via the EGR pipe 22, the EGR cooler 21, and the EGR valve 20.

Figure 2:
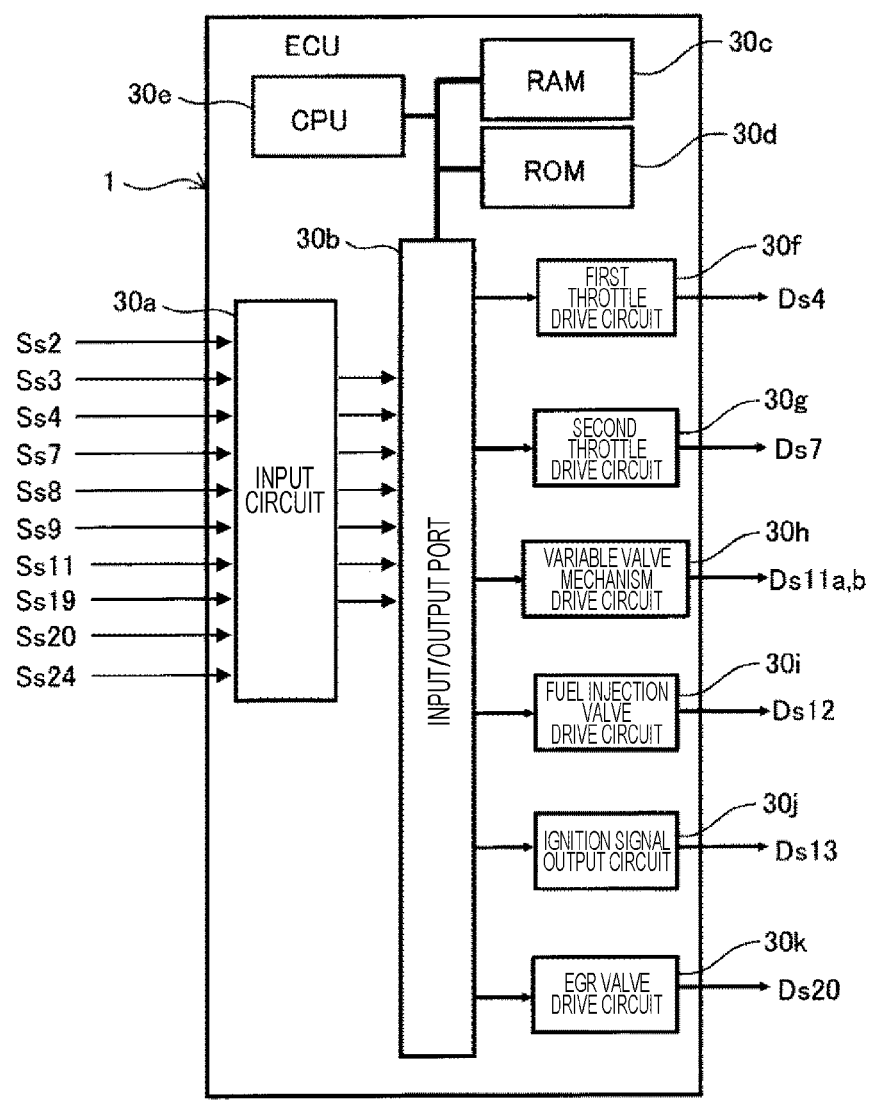
FIG. 2 is a system block diagram illustrating a configuration of the control unit of FIG. 1.

FIG. 2 illustrates system blocks of the configuration of the ECU 1. Signals output from the accelerator opening degree sensor 2, the air flow sensor 3, the intake pipe pressure sensor 8, the mixed gas humidity sensor 9, and the air-fuel ratio sensor 16 are input to an input circuit 30a of the ECU 1. The input signals may include other signals. Signals input from the sensors are sent to an input port of an input/output port 30b.

Values of the input signals sent to the input/output port 30b are stored in a random access memory (RAM) 30c and receive arithmetic processing by a CPU 30e. At this time, analog signals of the input signals sent to the input circuit 30a are converted into digital signals by an A/D converter provided in the input circuit 30a.

A control program describing details of the arithmetic processing is written in a read only memory (ROM) 30d in advance. Values indicating the operation amount of each actuator calculated according to the control program are stored in the RAM 30c, sent to the output port of the input/output port 30b, and sent to each actuator via each drive circuit.

Drive circuits of the present embodiment are, for example, a first throttle drive circuit 30f, a second throttle drive circuit 30g, a movable-valve-mechanism drive circuit 30h, a fuel-injection-valve drive circuit 30i, an ignition output circuit 30j, an EGR valve drive circuit 30k, and the like. Respective drive circuits control the first throttle valve 4, the second throttle valve 7, the movable valve mechanisms 11a and 11b, the fuel injection valve 12, the ignition plug 13, and the EGR valve 20. Although the ECU 1 of the present embodiment includes drive circuits in the ECU 1, the ECU 1 is not limited thereto and any or all of the drive circuits may be provided outside the ECU 1.

Figure 3:
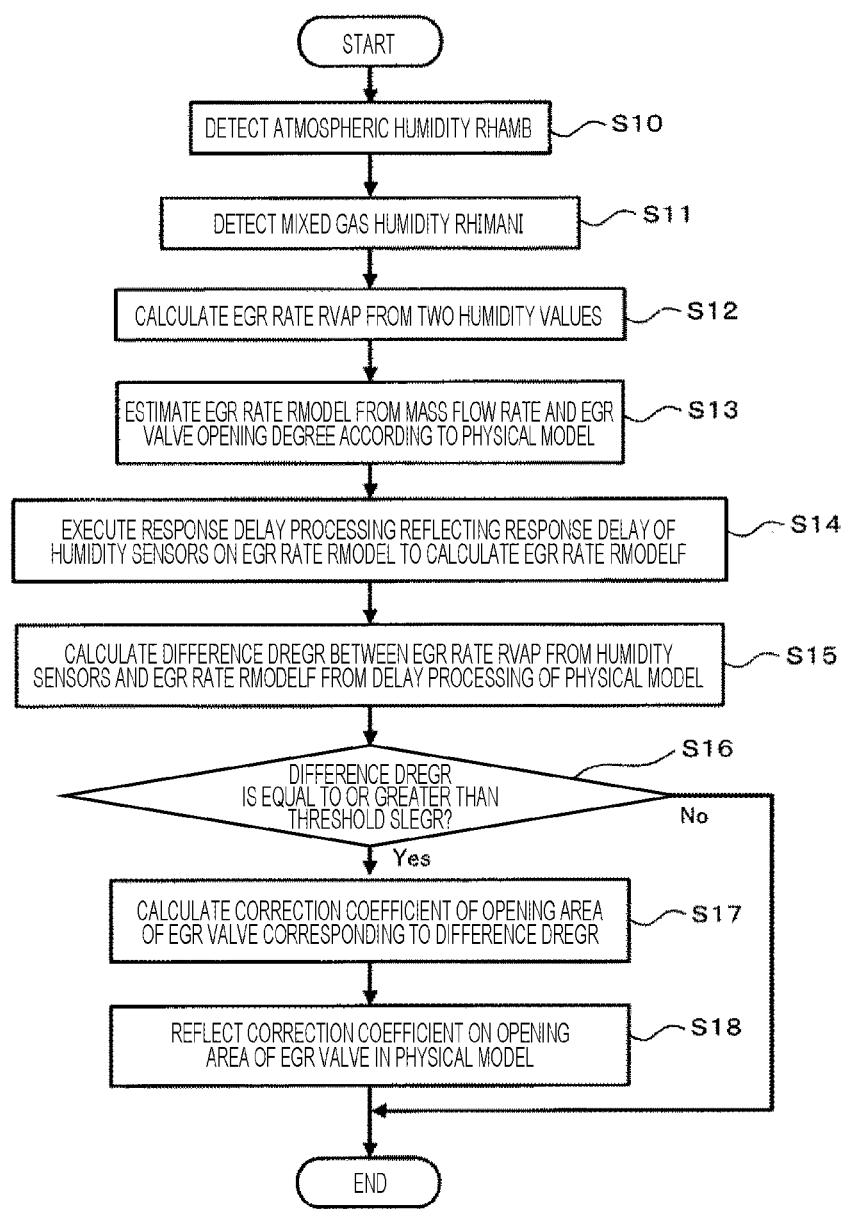
FIG. 3 is a flowchart illustrating physical model learning for estimating an EGR rate according to a first embodiment of the present invention.

FIG. 3 illustrates a control flow relating to the learning correction of the EGR rate in the first embodiment of the present invention.

First, in step S10, the atmospheric humidity sensor 24 detects the atmospheric humidity RHAMB of the intake air. Next, in step S11, the mixed gas humidity sensor 9 detects the mixed gas humidity RHIMANI of the mixed gas flowing through the intake pipe 10 in the downstream of the second throttle valve 7. After the humidity is detected from the humidity sensors 9 and 24 in steps S10 and S11, the process proceeds to step S12. The humidity sensors 24 and 9 function as EGR sensors.

In step S12, an EGR rate RVAP in the downstream of the second throttle valve 7 in the intake pipe is calculated from the atmospheric humidity RHATM and the mixed gas humidity RHIMANI detected in steps S10 and S11. Since the EGR gas is a mixed gas, the mixed gas humidity RHIMANI changes its value more than the value of the atmospheric humidity RHATM. Therefore, the "EGR rate RVAP" can be calculated from each humidity by a known method. After the "EGR rate RVAP" is calculated, the process proceeds to step S13.

In step S13, "EGR rate RMODEL" of the mixed gas in the downstream of the second throttle valve 7 is calculated by a plurality of mathematical equations (which is so-called a physical model) describing the behavior of the mixed gas on the basis of one or more pieces of information of the air flow rate information of the air flow sensor 3, the opening degree information of the EGR valve 20, the opening degree information of the second throttle valve 7, and other sensor information as necessary. The physical model can be constituted by combining a state equation or a motion equation of the gas. This physical model is stored in the ROM 30d of the ECU 1. When the "EGR rate RMODEL" of the mixed gas is determined by the physical model, the process proceeds to step S14.

In step S14, the "EGR rate RMODELF" after response delay processing is calculated by reflecting a measurement response delay of the design of the mixed gas humidity sensor 9 as a first order lag on the "EGR rate RMODEL," which has been estimated according to the physical model. Thus, the detection delay of the humidity sensor 9 is reflected on the "EGR rate RMODEL" estimated with the physical model. After the "EGR rate RMODELF" is subjected to the response delay processing, the process proceeds to step S15.

In step S15, "difference DREGR" between the "EGR rate RVAP" based on the humidity sensor and the "EGR rate RMODELF" subjected to response delay processing is calculated. This is determined by calculating "difference DREGR"="EGR rate RMODELF"−"EGR rate RVAP". After the "difference DREGR" is obtained, the process proceeds to step S16.

In step S16, it is determined whether the "difference DREGR" of the EGR rate is equal to or greater than a predetermined "threshold SLEGR." If the "difference DREGR" is equal to or greater than the "threshold SLEGR," the process proceeds to step S17. If the "difference DREGR" is smaller than the "threshold SLEGR," the process proceeds to the end. If the "difference DREGR" is equal to or greater than the predetermined "threshold SLEGR," the opening degree of the EGR valve of the physical model is regarded as inappropriate. If the "difference DREGR" is smaller than the predetermined "threshold SLEGR," the opening degree of the EGR valve of the physical model is regarded as falling within an appropriate range. When the "difference DREGR" is equal to or greater than the "threshold SLEGR," the process proceeds to step S17.

In step S17, the "difference DREGR" and "correction coefficient KAEGRV" of the EGR valve opening area, which corresponds to the opening degree of the EGR valve 20 at the time when the "difference DREGR" is obtained, are read and calculated from the table stored in the ROM 30d. The table is set such that larger "difference DREGR" corresponds to larger "correction coefficient KAEGRV." When the "correction coefficient KAEGRV" is obtained, the process proceeds to step S18.

In step S18, a calculation for reflecting the "correction coefficient KAEGRV," which corresponds to the "difference DREGR," on the opening area of the EGR valve 20, which is used in the equations constituting the physical model for calculating the "EGR rate RMODEL" calculated in the previous step S13, is executed. This allows execution of learning correction of the "EGR rate RMODEL."

Although the "correction coefficient KAEGRV" is reflected by multiplying it by the opening area of the EGR valve 20 in the present embodiment, the "correction opening area" may be added to and reflected on the opening area of the EGR valve 20. If the "correction coefficient KAEGRV" is reflected on the opening area of the EGR valve 20, the process goes to the end and waits for the next activation timing.

Figure 4:
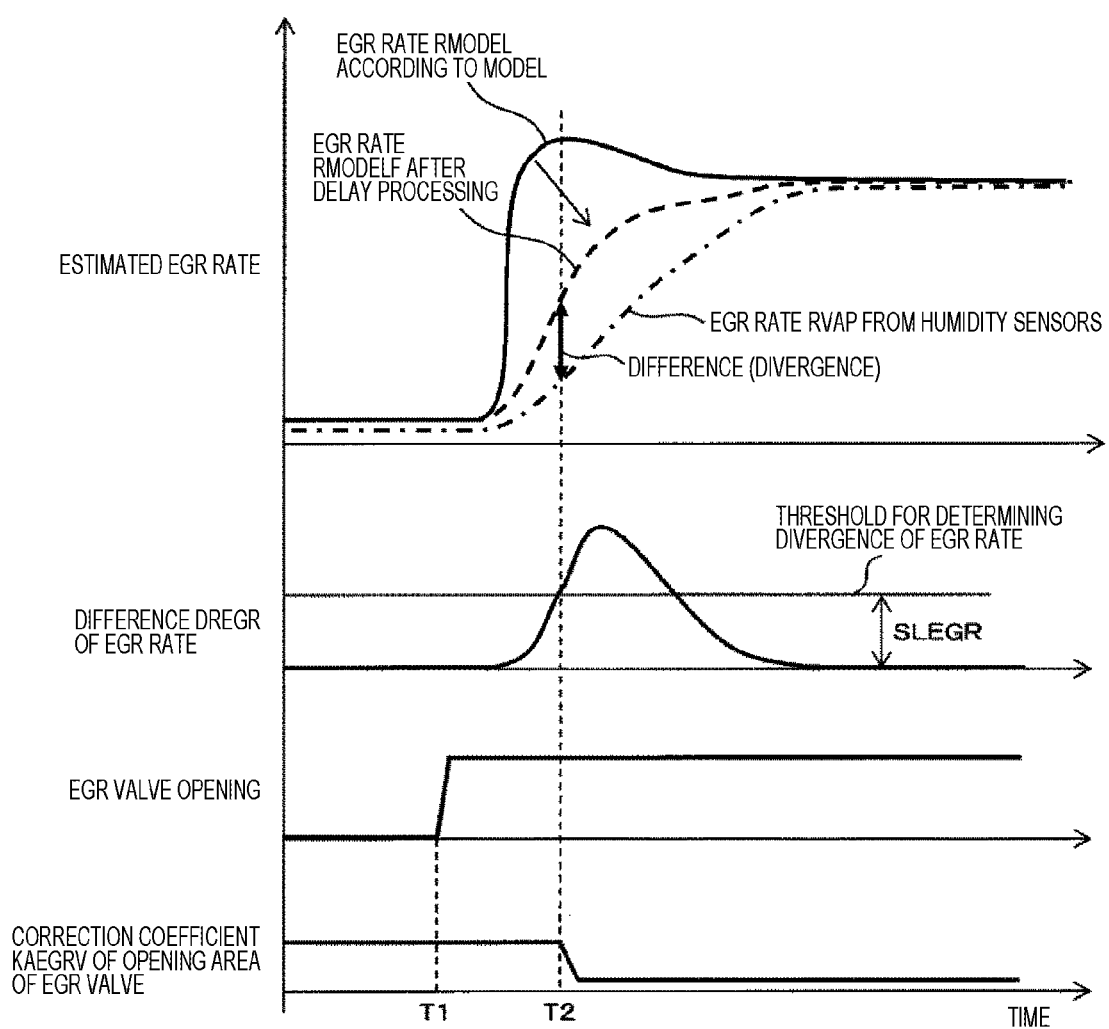
FIG. 4 is an explanatory diagram of an operation of the physical model learning for estimating the EGR rate according to the first embodiment.

Temporal changes in the estimated EGR rate, the difference of the EGR rate, the correction coefficient, and the like, which are obtained by the above-described control flow, are briefly described by referring to FIG. 4.

In FIG. 4, in the transient state in which the operating state of the internal combustion engine changes, for example, when the EGR valve 20 is largely opened at time T1, the EGR gas amount increases and the estimated EGR rate greatly changes. At this time, the "EGR rate RVAP" based on the humidity sensor is obtained from step S10 to step S12.

Meanwhile, the "EGR rate RMODEL" of the mixed gas is obtained by the physical model on the basis of the air flow rate of the air flow sensor 3, the opening degree of the second throttle valve 7, and the opening degree of the EGR valve 20 in step S13. Further, in step S14, the "EGR rate RMODEL" is subjected to response delay processing to obtain "EGR rate RMODELF." As illustrated in FIG. 4, the "EGR rate RMODEL" is subjected to the delay processing to the "EGR rate RMODELF."

Then, as the control flow proceeds to step S15 in which the "difference DREFR" between "EGR rate RVAP" and the "EGR rate RMODELF" is calculated. In step S16, if it is determined that the "difference DREFR" is greater than the "threshold SLEGR" at time T2, that is, if it is determined that "EGR rate RVAP" and "EGR rate RMODELF" are largely divergent from each other, the "correction coefficient KAEGRV" is reflected (i.e., learning correction) on the calculation result of the opening area of the EGR valve 20 of the physical model.

In the case of FIG. 4, therefore, the "EGR rate RMODELF" is greater than the "EGR rate RVAP," so that the learning to decrease the "correction coefficient KAEGRV" of the opening area of the EGR valve 20 is carried out. Naturally, therefore, when the "EGR rate RMODELF" is smaller than the "EGR rate RVAP," the learning to increase the "correction coefficient KAEGRV" of the opening area of the EGR valve 20 is carried out.

Figure 5A:
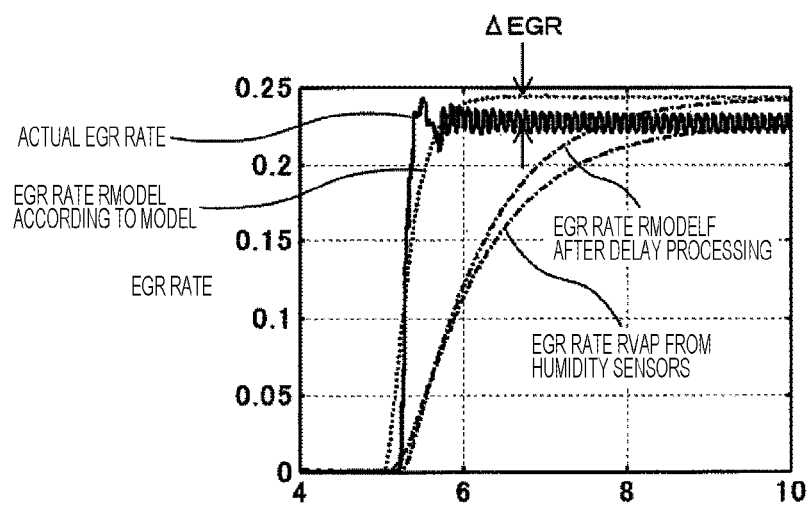
FIG. 5A is an explanatory diagram for explaining a state before the learning according to the first embodiment.
Figure 5B:
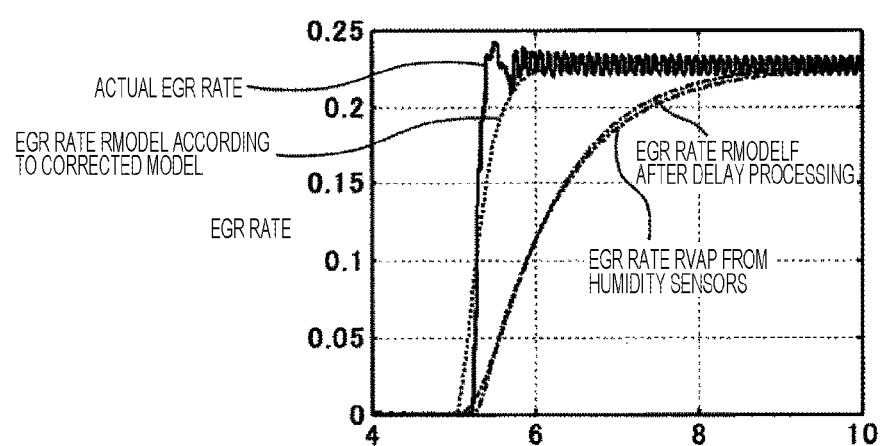
FIG. 5B is an explanatory diagram for describing a state after the learning according to the first embodiment.

FIGS. 5A and 5B are graphs illustrating changing states of the actual EGR rate in the intake pipe 10, the "EGR rate RMODEL" according to the physical model, the "EGR rate RMODELF" subjected to the response delay processing, and the "EGR rate RVAP" from the humidity sensors 9 and 24, when the EGR valve 20 is largely opened.

FIG. 5A illustrates the EGR rates described above before carrying out the correction in a case where predetermined "clogging" is given artificially to the EGR valve 20. The actual EGR rate rises stepwise and the "EGR rate RMODEL" estimated by the physical model resembles the actual EGR rate in responsiveness during rising, but a predetermined error ΔEGR occurs in the case of transition to the steady state. The "EGR rate RVAP" calculated by the humidity sensors 9 and 24 and the actual EGR rate accurately match in the steady state, but the responsiveness delays and the measurement accuracy decreases in the transient state. The "EGR rate RMODELF" that does not reflect the response delay of the mixed gas humidity sensor 9 on the "EGR rate RMODEL" estimated by the physical model is relatively close to the "EGR rate RVAP," but in the steady state, a deviation occurs against the actual EGR rate and the deviation increases from the actual EGR rate with the lapse of time. This proves the necessity of the correction of the EGR rate.

Meanwhile, FIG. 5B illustrates a case where the "correction coefficient KAEGRV" is reflected by considering the "clogging" in the opening area of the EGR valve 20 of the physical model according to the present embodiment. It can be seen that "EGR rate RMODELF" and "EGR rate RVAP" substantially match. It is also seen that, in this state, the actual EGR rate and the "EGR rate RMODEL" estimated by the physical model well aligned.

As described above, in the present embodiment, the EGR rate that is calculated on the basis of the value of the humidity sensor (i.e., EGR sensor) attached to the intake pipe is compared with the EGR rate that is estimated from the air flow sensor or the like according to the physical model and subjected to the response delay processing. Then, on the basis of the deviation of both EGR rates, the learning correction is carried out on the opening area of the EGR valve of the physical model to improve the estimation accuracy of the EGR rate by the physical model.

Second Embodiment

Next, a second embodiment of the present invention is described. The present embodiment is different from the first embodiment in that compensating control for the variation of the EGR rate that occurs due to the influence of dew condensation adhering to the intake pipe is added. Therefore, description including the operations and effects of the first embodiment is not repeated below.

Figure 6:
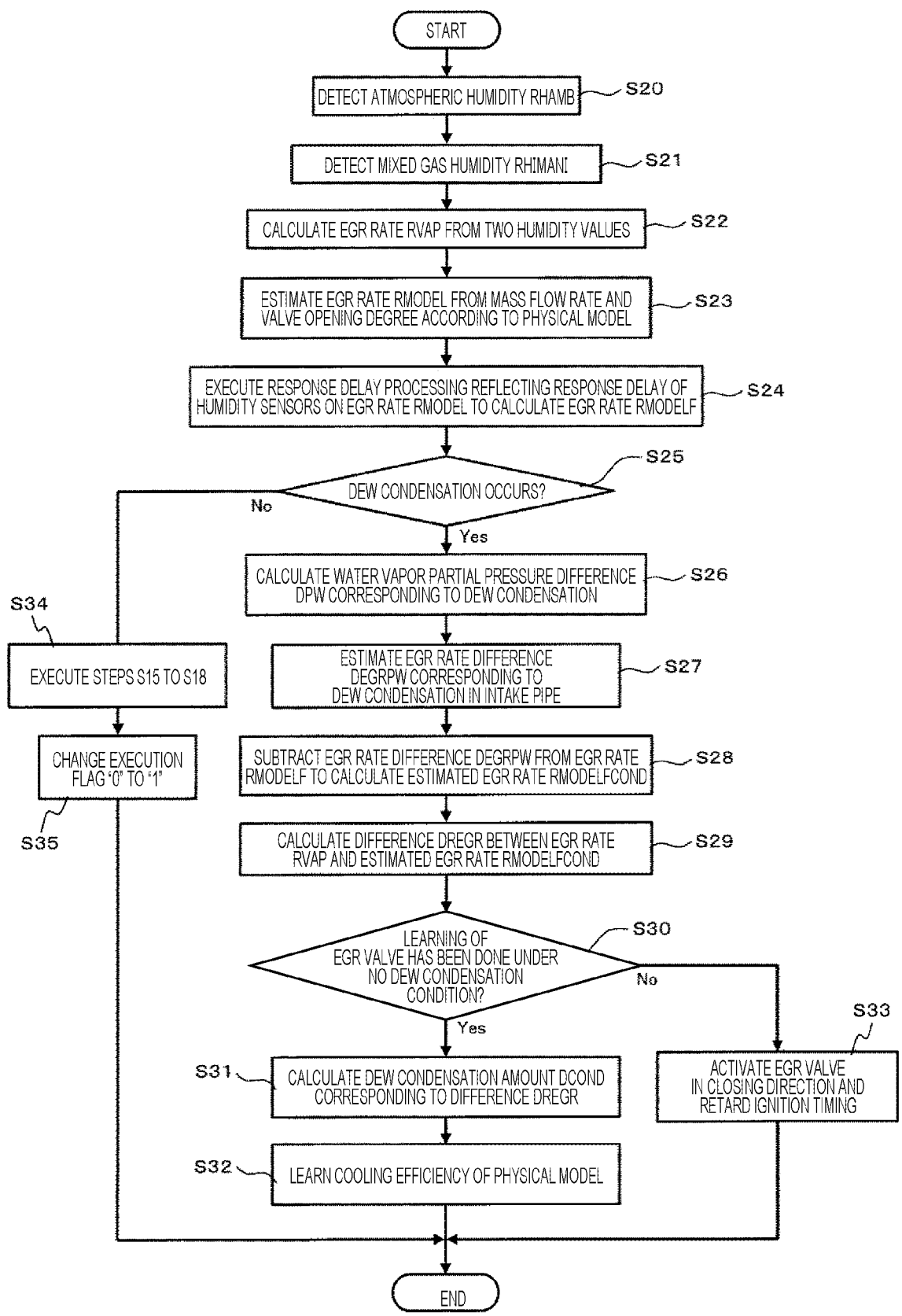
FIG. 6 is a flowchart of the physical model learning for estimating the EGR rate by considering dew condensation according to a second embodiment of the present invention.

FIG. 6 illustrates a control flow of the second embodiment of the present invention. Steps S20 to S24 are the same as steps S10 to S14 of FIG. 3 and the description thereof is not repeated. When the process of step S24 is completed, the process proceeds to step S25.

In step S25, it is estimated if dew condensation occurs in the intake pipe 10. Specifically, "saturated water vapor pressure PWIMANI" is calculated from "temperature TIMANI" of the intake pipe 10. A relationship between temperature and saturated water vapor pressure may be stored in the table in the ROM 30$d$ or calculated using "Tetens equation" given as equation (1) below.

[MATH. 1]

$$PWIMANI = 6.1078 \times 10^{(7.5 \times TIMANI/(237.3+TIMANI))} \quad (1)$$

Next, a water vapor partial pressure in the intake pipe 10 is calculated from the "EGR rate RMODEL" estimated by the physical model. Using "water vapor volume fraction H2OCMB" in the exhaust gas generated by combustion, "water vapor volume fraction H2OATM" calculated from the atmospheric humidity, and the "EGR rate RMODEL" obtained by the physical model, "water vapor volume fraction H2OIMANI" in the intake pipe 10 is calculated by equation (2).

[MATH. 2]

$$H2OIMANI = RMODEL \times H2OCMB + H2OATM \quad (2)$$

Next, the "water vapor partial pressure PWIMANIEST" in the intake pipe 10 is calculated from the "water vapor volume fraction H2OIMANI" in the intake pipe 10 and the "intake pressure PIMANI" in the intake pipe 10 by equation (3).

[MATH. 3]

$$H2OIMANI = RMODEL \times H2OCMB + H2OATM \quad (2)$$

If the "water vapor partial pressure PWIMNIEST" is greater than "saturated water vapor pressure PWIMANI," the presence of dew condensation is determined. If no dew condensation is determined, the process proceeds to step S34, and the physical model learning of the EGR valve 20 is carried out according to steps S15 to S18 of FIG. 3, and the process proceeds to step S35. When the learning of the physical model in the case of no dew condensation is executed, an execution flag is set in step S35 and used for determination in step S30 which is described later. Meanwhile, if the presence of dew condensation is determined, the process proceeds to step S26.

In step S26, "partial pressure difference DPW" between the "saturated water vapor pressure PWIMANI" and "water vapor partial pressure PWIMNIEST." This is the "partial pressure difference DPW" corresponding to the dew condensation. When "partial pressure difference DPW" is obtained, the process proceeds to step S27.

In step S27, "EGR rate difference DEGRPW" corresponding to the dew condensation in the intake pipe 10, which corresponds to the calculated "partial pressure difference DPW", is estimated and calculated. Since the ratio of CO2 and H2O in the exhaust gas is substantially constant in the "partial pressure difference DPW" and the "EGR rate difference DEGRPW", the relationship between these differences can be stored in the table of the ROM 30d. After the "EGR rate difference DEGRPW" is estimated, the process proceeds to step S28.

In step S28, "estimated EGR rate RMODELFCOND" which reflects the detection deviation of the mixed gas humidity sensor due to the dew condensation and the detection delay of the mixed gas humidity sensor 9 is calculated by subtracting the "EGR rate difference DEGRPW" from the "EGR rate RMODEF" subjected to the delay processing. The actual ratio of H2O and CO2 changes, as illustrated in FIG. 7, when the dew condensation occurs, but the ratio is constant in the humidity sensor, so that it is possible to simulate the behavior of the humidity sensor by subtracting the "EGR rate difference DEGRPW" from the "EGR rate RMODEF."

FIGS. 7A to 7C schematically illustrate the composition of the mixed gas in the intake pipe 10. Note that the area of each component is changed in the drawings for convenience of explanation, so that the area ratio is different from the actual ratio. FIG. 7A illustrates a case where only air is present, FIG. 7B illustrates a case where air and the EGR gas are mixed, and FIG. 7C illustrates a case where the dew condensation is present in addition to air and the EGR gas.

As illustrated in FIG. 7B, moisture in the air and moisture generated as a result of combustion are present in the mixed gas including the EGR gas. The ratio of H2O to CO2 in the EGR gas is substantially constant. Therefore, it is possible to estimate the EGR amount on the basis of the difference between the humidity in the air and the humidity inside the intake pipe. However, when the dew condensation occurs, as illustrated in FIG. 7C, only H2O decreases and the actual ratio of H2O and CO2 changes. Therefore, when the EGR rate is calculated on the basis of the moisture content measured by the mixed gas humidity sensor 9, the EGR rate is underestimated, as it is determined that CO2 is also decreasing. In step S608, therefore, the EGR amount including CO2 is subtracted in addition to the amount of moisture. After the "estimated EGR rate RMODELFCOND" is calculated, the process proceeds to step S29.

In step S29, the "difference DREGR" between the "EGR rate RVAP" and the "estimated EGR rate RMODELFCOND" is calculated. Note that the "difference DREGR" corresponds to the dew condensation amount. After the "difference DREGR" is obtained, the process proceeds to step S30.

In step S30, it is determined whether the learning correction of the "correction coefficient KAEGRV" of the EGR valve opening area has already been carried out in a predetermined period in the past. This determination can be made by referring to the above-described execution flag. If the learning correction has been carried out, the process proceeds to step S31. If the learning correction has not been carried out, the process proceeds to step S33.

In step S31, "dew condensation amount DCOND" corresponding to the "difference DREGR" is calculated. The "dew condensation amount DCOND" corresponding to the "difference DREGR" needs to be stored in advance in the table of the ROM 30d. After the "dew condensation amount DCOND" is obtained, the process proceeds to step S32.

In step S32, the learning correction in which "cooling correction coefficient KHEATEGR" corresponding to the "dew condensation amount DCOND" is applied to the heat transfer parameter relating to the intercooler 6 of the physical model, thus improving the estimation accuracy of the EGR rate by the physical model.

If no learning correction of the EGR valve is performed in step S30, the EGR valve is fully closed or the opening degree is controlled to decrease in step S33, so that excessive EGR gas supply is suppressed and, simultaneously, the ignition timing is retarded to suppress occurrence of the abnormal combustion.

As described above, estimating the dew condensation amount in the physical model makes it possible to improve the estimation accuracy of the EGR rate even under a condition in which the dew condensation is likely to occur, thereby improving fuel consumption. Further, when the learning condition is not satisfied, the opening degree of the EGR valve is decreased and the ignition timing is retarded, so that excessive EGR is introduced to suppress misfire and abnormal combustion.

Third Embodiment

Next, a third embodiment of the present invention is described. Although the humidity sensor is used as the EGR sensor in the first embodiment, the present embodiment is different from the first embodiment in that the intake-side oxygen concentration sensor is used as the EGR sensor. The intake-side oxygen concentration sensor can measure the oxygen concentration in the mixed gas in the intake pipe 10, whereby the EGR rate can be measured.

Figure 8:
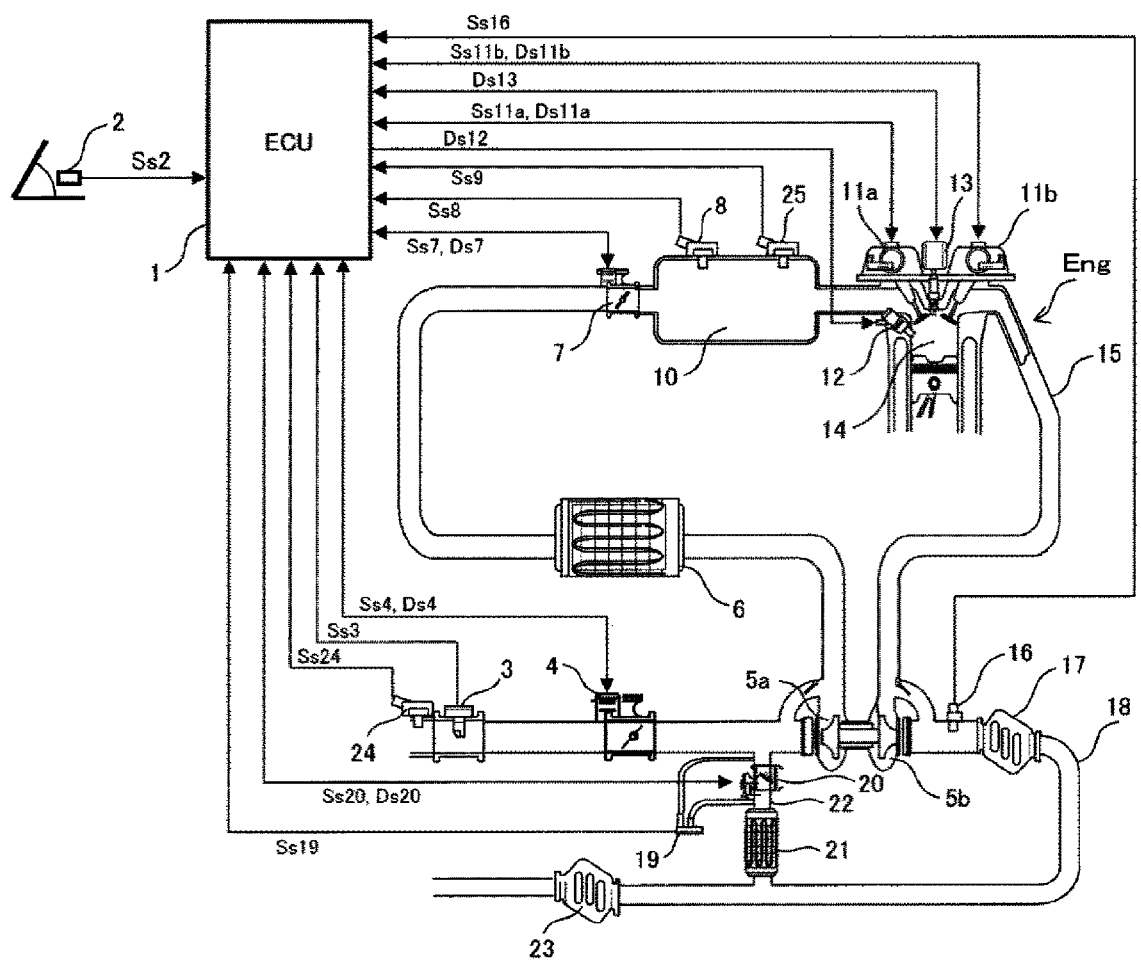
FIG. 8 is a configuration diagram illustrating a system configuration of another internal combustion engine to which the present invention is applied.

FIG. 8 illustrates a configuration of the internal combustion engine system according to the present embodiment, and an intake-side oxygen concentration sensor 25 is disposed in the intake pipe 10. The intake-side oxygen concentration sensor 25 is capable of outputting an output signal that is linear with respect to the oxygen concentration, whereby the EGR rate of the mixed gas can be obtained. Other portions of the configuration are the same as those illustrated in FIG. 1 and are not described in detail.

Figure 9:
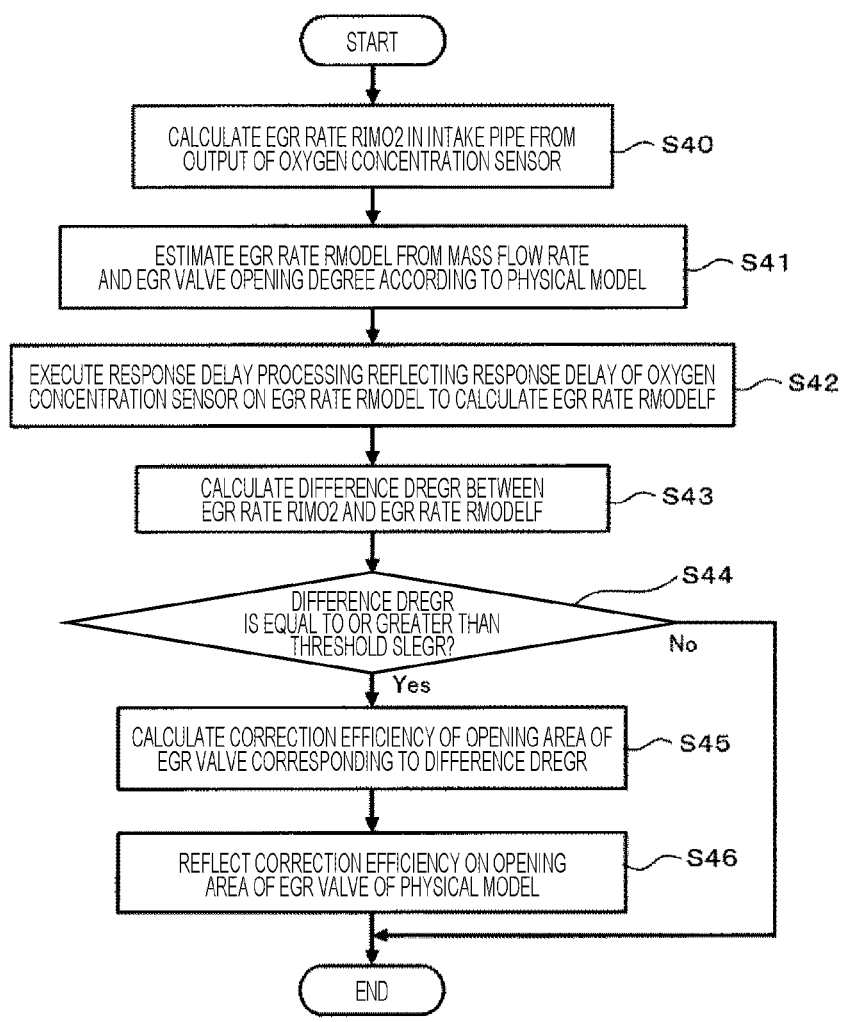
FIG. 9 is a flowchart illustrating the physical model learning for estimating the EGR rate according to a third embodiment of the present invention.

FIG. 9 illustrates a control flow relating to the learning correction of the EGR rate in the third embodiment of the present invention. The control steps of the steps S41 to S46 are the same as the control of the steps S13 to S18 of FIG. 3 and are not described in detail.

In step S40 of FIG. 9, "EGR rate RIMO2" in the intake pipe 10 is calculated from the oxygen concentration detected by the intake-side oxygen concentration sensor 25. Since various methods for calculating the EGR rate from the oxygen concentration have been proposed, they may be obtained by these known methods. When "EGR rate RIMO2" in the intake pipe 10 is obtained, the process proceeds to step s1. Thereafter, the "EGR rate RVAP" in FIG. 3 is replaced by the "EGR rate RIMO2," and the same control steps as in FIG. 3 are executed.

As described above, by comparing the EGR rate, which is calculated on the basis of the value of the intake-side oxygen concentration sensor (i.e., EGR sensor) attached to the intake pipe, and the EGR rate, which is estimated from the air flow sensor or the like on the basis of the physical model and subjected to the response delay processing, and executing the learning correction on the opening area of the EGR valve of the physical model on the basis of the deviation between the EGR rates, the estimation accuracy of the EGR rate according to the physical model is improved.

Fourth Embodiment

Next, a fourth embodiment of the present invention is described. Although a humidity sensor is used as the EGR sensor in the second embodiment, this embodiment is different from the second embodiment in that an intake-side oxygen concentration sensor is used as the EGR sensor. As described above, the intake-side oxygen concentration sensor can measure the oxygen concentration in the mixed gas in the intake pipe 10, whereby the EGR rate can be measured.

Figure 10:
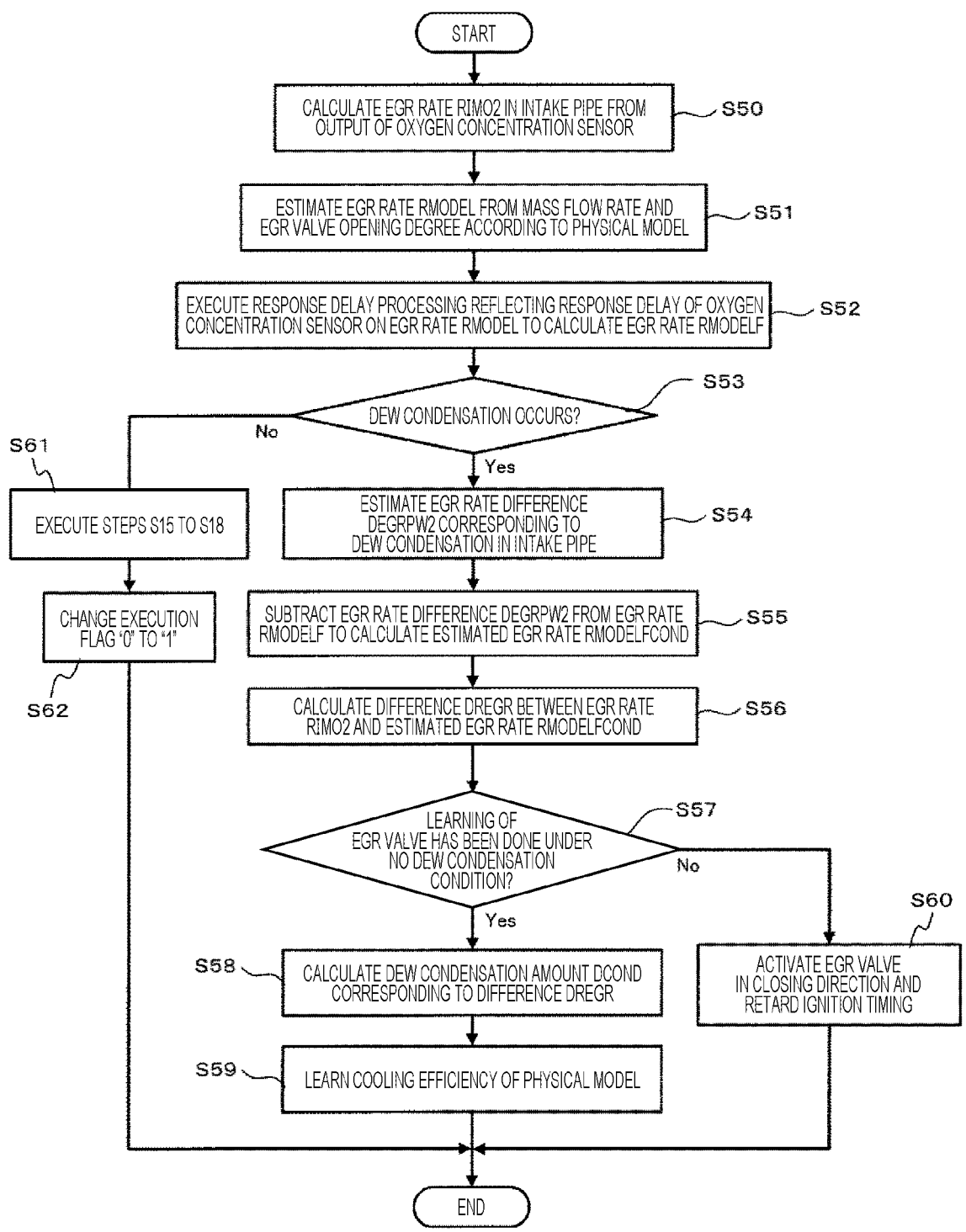
FIG. 10 is a flowchart illustrating physical model learning for estimating an EGR rate by considering dew condensation according to a fourth embodiment of the present invention.

FIG. 10 illustrates a control flow relating to the learning correction of the EGR rate according to the fourth embodiment of the present invention. The control steps of the steps S51 to S62 are the same as the control of the steps S23 to S35 of FIG. 6 and are not described in detail.

In step S50 of FIG. 10, the "EGR rate RIMO2" in the intake pipe 10 is calculated from the oxygen concentration detected by the intake-side oxygen concentration sensor 25. As in other embodiments, various methods have been proposed to calculate the EGR rate from the oxygen concentration in the present embodiment, and the EGR rate needs to be determined by any of those known methods. When "EGR rate RIMO2" in the intake pipe 10 is obtained, the process goes to step S51. Thereafter, the same control steps as those in FIG. 6 are executed.

As described above, estimating the dew condensation amount in the physical model makes it possible to improve the estimation accuracy of the EGR rate even under a condition in which the dew condensation is likely to occur, thereby improving fuel consumption. Further, when the learning condition is not satisfied, the opening degree of the EGR valve is decreased and the ignition timing is retarded, so that excessive EGR is introduced to suppress misfire and abnormal combustion.

As described above, in the present invention, the first EGR rate is obtained using, as an input, the detection signal of the EGR sensor, which is provided on the downstream side of the throttle valve adjusting the flow rate of the mixed gas of air and the EGR gas flowing through the intake pipe, the second EGR rate is estimated by carrying out predetermined calculations using, as an input, the detection signals of at least the air flow sensor and the EGR valve opening degree sensor, the third EGR rate is determined by carrying out the delay processing on the second EGR rate corresponding to the response delay of the EGR sensor, and the learning correction is carried out on the second EGR rate by reflecting the difference between the third EGR rate and the first EGR rate.

Thus, it is possible to estimate the EGR rate with high accuracy even in the transient state. As a result, an appropriate amount of EGR gas is introduced into the combustion chamber to avoid abnormal combustion, whereby deterioration of fuel consumption can be prevented.

The present invention is not limited to the embodiments described above, and may include various other modifications. For example, the above embodiments have been described in detail to facilitate the understanding of the present invention, and all constituent components are not necessarily provided. Some of the constituent components of a certain embodiment can be partially replaced by those of other embodiments, or the constituent components of other embodiments can be added to a certain embodiment. Further, some of the constituent components of each embodiment may be added, deleted, or substituted for by other constituent components.

REFERENCE SIGNS LIST

1 ECU
2 accelerator opening degree sensor
3 air flow sensor
4 first throttle valve
5 supercharger
6 intercooler
7 second throttle valve
8 intake pipe pressure sensor
9 mixed gas humidity sensor
12 fuel injection valve
13 ignition plug
19 differential pressure sensor
20 EGR valve
21 EGR cooler
24 atmospheric humidity sensor
25 intake-side oxygen concentration sensor

The invention claimed is:

1. A control device for an internal combustion engine, the internal combustion engine including:
an external EGR device with an EGR valve configured to recirculate exhaust gas from an exhaust system to an intake system of the internal combustion engine,
an air flow sensor provided in the intake system of the internal combustion engine and measuring an air flow rate of air taken into the internal combustion engine, and
an EGR sensor detecting an EGR rate of a mixed gas mixed with the exhaust gas,
the control device for the internal combustion engine comprising:
a processor configured to
estimate the EGR rate of the mixed gas according to at least the air flow sensor and the EGR sensor,
determine a first EGR rate using, as an input, a detection signal of the EGR sensor provided on a downstream side of a throttle valve which adjusts a flow rate of the mixed gas flowing through the intake system and a second detection signal of a sensor at an intake of the intake system,
calculate a second EGR rate, based on a predetermined equation using, as an input, one or more detection signals of at least the air flow sensor, an opening degree sensor of the EGR valve, and an opening degree sensor of the throttle valve, carry out response delay processing by calculating a measurement response delay of the EGR sensor as a lag on the second EGR rate to determine a third EGR rate, determine whether dew condensation is present in the intake system when an estimated water vapor partial pressure in the intake system becomes equal to or higher than a saturated water vapor pressure, and when the dew condensation is not present, correct the second EGR rate based on a difference between the third EGR rate and the first EGR rate, and when the dew condensation is present, correction of the second EGR rate is not executed, a partial pressure difference corresponding to the dew condensation is calculated and an EGR rate difference is calculated.

2. The control device for the internal combustion engine according to claim 1, wherein
the EGR sensor is at least constituted by a mixed gas humidity sensor provided in the intake system and configured to detect humidity of the mixed gas.

3. The control device for the internal combustion engine according to claim 2, wherein
the EGR sensor is constituted by an atmospheric humidity sensor provided in the intake system and configured to detect humidity of air in addition to the mixed gas humidity sensor.

4. The control device for the internal combustion engine according to claim 1, wherein
the EGR sensor is constituted by an intake-side oxygen concentration sensor provided in the intake system and configured to detect an oxygen concentration of the mixed gas.

5. The control device for the internal combustion engine according to claim 1, wherein
the processor calculates a physical model comprising a plurality of mathematical equations that simulate behavior of the mixed gas to calculate the second EGR rate.

6. The control device for the internal combustion engine according to claim 5, wherein
the processor carries out the correction on the second EGR rate when the third EGR rate and the first EGR rate are deviated from each other by at least a predetermined value.

7. The control device for the internal combustion engine according to claim 6, wherein
the correction by the processor is executed when an opening area of the EGR valve used in the physical model is corrected.

8. The control device for the internal combustion engine according to claim 7, wherein
the correction by the processor decreases the opening area of the EGR valve when the third EGR rate is greater than the first EGR rate, and
the correction by the processor increases the opening area of the EGR valve when the third EGR rate is smaller than the first EGR rate.

9. The control device for the internal combustion engine according to claim 1, wherein
the estimated water vapor partial pressure is calculated from a pressure and a temperature of the mixed gas in the intake system.

10. The control device for the internal combustion engine according to claim 1, wherein
the processor decreases an opening area of the EGR valve and retards ignition timing of an ignition plug when it is determined that the dew condensation is present.

* * * * *